United States Patent
Merry et al.

(10) Patent No.: US 9,677,475 B2
(45) Date of Patent: Jun. 13, 2017

(54) GAS TURBINE ENGINE WITH HIGH SPEED AND TEMPERATURE SPOOL COOLING SYSTEM

(71) Applicant: United Technologies Corporation, Hartford, CT (US)

(72) Inventors: Brian D. Merry, Andover, CT (US); Gabriel L. Suciu, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 225 days.

(21) Appl. No.: 14/597,442

(22) Filed: Jan. 15, 2015

(65) Prior Publication Data

US 2016/0208713 A1    Jul. 21, 2016

(51) Int. Cl.
   *F02C 9/18* (2006.01)
   *F01D 5/08* (2006.01)
   (Continued)

(52) U.S. Cl.
   CPC .............. *F02C 9/18* (2013.01); *F01D 5/082* (2013.01); *F01D 5/084* (2013.01); *F01D 5/088* (2013.01);
   (Continued)

(58) Field of Classification Search
   CPC ...... F02C 9/18; F02C 3/10; F02C 7/18; F01D 5/082; F01D 5/084; F01D 5/088; F01D 25/12
   See application file for complete search history.

(56) References Cited

U.S. PATENT DOCUMENTS

| | | | | |
|---|---|---|---|---|
| 4,657,482 A | * | 4/1987 | Neal | ........................ F02C 7/18 415/116 |
| 5,555,721 A | * | 9/1996 | Bourneuf | .................. F02C 7/18 415/115 |

(Continued)

FOREIGN PATENT DOCUMENTS

| EP | 1533473 | 5/2005 |
|---|---|---|
| WO | 2014159200 | 10/2014 |

OTHER PUBLICATIONS

International Application No. PCT/US2014/064956 filed Nov. 11, 2014 titled Segmented Seal for Gas Turbine Engine.
(Continued)

*Primary Examiner* — Steven Sutherland
(74) *Attorney, Agent, or Firm* — Carlson, Gaskey & Olds, P.C.

(57) ABSTRACT

A gas turbine engine includes a turbine section that includes a turbine rotor arranged in a plenum. A compressor section includes a compressor rotor assembly that has spaced apart inner and outer portions that provide an axially extending cooling channel. Compressor blades extend radially outward from the outer portion which provides an inner core flow path. A rotor spoke is configured to receive a first cooling flow and fluidly connect the outer portion to the cooling channel. The compressor rotor assembly has a coolant exit that is in fluid communication with the cooling channel. The compressor rotor assembly is configured to communicate the first cooling flow to the turbine rotor. A bleed source is configured to provide a second cooling flow. A combustor section includes an injector in fluid communication with the bleed source. The tangential onboard injector is configured to communicate the second cooling flow to the turbine rotor.

18 Claims, 5 Drawing Sheets

(51) Int. Cl.
    *F01D 25/12*   (2006.01)
    *F02C 7/18*    (2006.01)
    *F02C 3/10*    (2006.01)
(52) U.S. Cl.
    CPC ............... F01D 25/12 (2013.01); F02C 3/10 (2013.01); F02C 7/18 (2013.01); *F05D 2250/322* (2013.01); *F05D 2260/20* (2013.01); *Y02T 50/676* (2013.01)

(56) References Cited

U.S. PATENT DOCUMENTS

| | | | | |
|---|---|---|---|---|
| 6,234,746 | B1* | 5/2001 | Schroder | F01D 5/08 |
| | | | | 415/110 |
| 6,334,755 | B1* | 1/2002 | Coudray | F01D 5/088 |
| | | | | 415/115 |
| 6,966,191 | B2* | 11/2005 | Fukutani | F01D 3/02 |
| | | | | 60/39.08 |
| 7,743,613 | B2* | 6/2010 | Lee | F01D 9/065 |
| | | | | 415/115 |
| 8,784,062 | B2 | 7/2014 | Suciu et al. | |
| 2012/0060507 | A1 | 3/2012 | King et al. | |
| 2013/0108413 | A1 | 5/2013 | Suciu et al. | |
| 2013/0108445 | A1 | 5/2013 | Suciu et al. | |

OTHER PUBLICATIONS

Extended European Search Report for European Application No. 16151310.6 mailed May 26, 2016.

\* cited by examiner

GAS TURBINE ENGINE WITH HIGH SPEED AND TEMPERATURE SPOOL COOLING SYSTEM

BACKGROUND

This disclosure relates to gas turbine engines having a high temperature spool with a cooling system.

A gas turbine engine typically includes a fan section, a compressor section, a combustor section and a turbine section. Air entering the compressor section is compressed and delivered into the combustor section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

One type of compressor includes a compressor rotor assembly that has successive rows of blades, which extend from respective rotor disks that are arranged in an axially stacked configuration. The rotor stack may be assembled through a multitude of systems such as fasteners, fusion, tie-shafts and combinations thereof.

The compressor rotor assembly operates in an environment in which significant pressure and temperature differentials exist across component boundaries that primarily separate a core gas flow path and a secondary cooling flow path. For high-pressure, high-temperature applications, the components experience thermo-mechanical fatigue (TMF) across these boundaries. As temperatures increase in engines, some components' resistance to TMF may be reduced. TMF may be particularly acute immediately upstream from the combustor section where "T3" temperature limits the operating temperature of the compressor rotor assembly and, therefore, the operating efficiency of the engine.

The temperature immediately downstream from the combustor section temperature, referred to as "T4" temperature, limits the operating temperature of the turbine section and the operating efficiency of the engine as well. To mitigate thermal degradation from the extreme temperatures, some or all of the turbine stages are actively cooled by passing relatively cool air through the turbine stage. The active cooling increases the life span of the components in the actively cooled turbine stage by thermal wear. In some example gas turbine engines, the relatively cool air is drawn from a bleed located in the compressor section (referred to as a compressor bleed) and is piped directly to the actively cooled turbine section through a tangential on board injection (TOBI) cooling system.

SUMMARY

In one exemplary embodiment, a gas turbine engine includes a turbine section that includes a turbine rotor arranged in a plenum. A compressor section includes a compressor rotor assembly that has spaced apart inner and outer portions that provide an axially extending cooling channel. Compressor blades extend radially outward from the outer portion which provides an inner core flow path. A rotor spoke is configured to receive a first cooling flow and fluidly connect the outer portion to the cooling channel. The compressor rotor assembly has a coolant exit that is in fluid communication with the cooling channel. The compressor rotor assembly is configured to communicate the first cooling flow to the turbine rotor. A bleed source is configured to provide a second cooling flow. A combustor section includes an injector in fluid communication with the bleed source. The tangential onboard injector is configured to communicate the second cooling flow to the turbine rotor.

In a further embodiment of the above, the compressor blades are bonded to the inner portion.

In a further embodiment of any of the above, an inlet opening is arranged upstream from and adjacent to the compressor blades. The inlet opening is configured to supply the first cooling flow to the cooling channel.

In a further embodiment of any of the above, the compressor section provides the bleed source.

In a further embodiment of any of the above, the compressor rotor assembly includes a hub that is arranged adjacent to the combustor section. The coolant exit is provided in the hub.

In a further embodiment of any of the above, the combustor section includes an exit guide vane that is arranged axially between the compressor rotor assembly and a combustor. The exit guide vane is configured to communicate the bleed air radially inward from the bleed source toward the injector.

In a further embodiment of any of the above, the compressor rotor assembly has a rotor disk that includes a rotor outer peripheral surface. A blade is supported on a platform that has a blade inner surface that faces the rotor outer peripheral surface. The cooling channel is defined between the rotor outer peripheral surface and the blade inner surface.

In a further embodiment of any of the above, the blade is integrally formed as one piece with the rotor disk.

In a further embodiment of any of the above, the turbine rotor is arranged in a plenum configured to receive the first and second cooling flows.

In a further embodiment of any of the above, the plenum is arranged radially inward of a core flow path. The plenum is defined by a forward wall, a shaft, an aft wall, and an inner diameter wall of the core flow path. The first and second cooling flows are thermally isolated from the core flow path.

In a further embodiment of any of the above, the injector extends into the plenum to deliver at least the second cooling flow to the turbine rotor.

In a further embodiment of any of the above, the shaft, to which the compressor rotor assembly is mounted, communicates the first flow to the plenum.

In another exemplary embodiment, a method of cooling a gas turbine engine turbine section includes the steps of providing a first cooling flow through an opening in an inner core flow path of a compressor rotor assembly, providing a second cooling flow to an injector and passing the first and second cooling flows to a turbine rotor to cool the turbine rotor.

In a further embodiment of any of the above, the compressor rotor assembly includes axially extending cooling channels beneath the inner core flow path. A spoke extends from the inner flow path into a cooling channel adjacent to compressor blades.

In a further embodiment of any of the above, the compressor rotor assembly includes a coolant exit. The passing step includes communicating the first cooling flow from the coolant exit to the turbine rotor.

In a further embodiment of any of the above, the second cooling flow providing step includes supplying bleed air from bleed source.

In a further embodiment of any of the above, the turbine rotor is arranged in a plenum. The passing step includes communicating the first and second cooling flows to the plenum.

In a further embodiment of any of the above, the method included is the step of preventing air from an adjacent plenum fore of the plenum from entering the plenum by at least disposing a first seal at a joint between a fore wall of the plenum and a structure of a first rotor in the plenum.

In a further embodiment of any of the above, the method includes the step of preventing air from an adjacent plenum aft of the plenum from entering the plenum by at least disposing a second seal at a joint between an aft wall of the plenum and a structure of a second rotor in the plenum.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
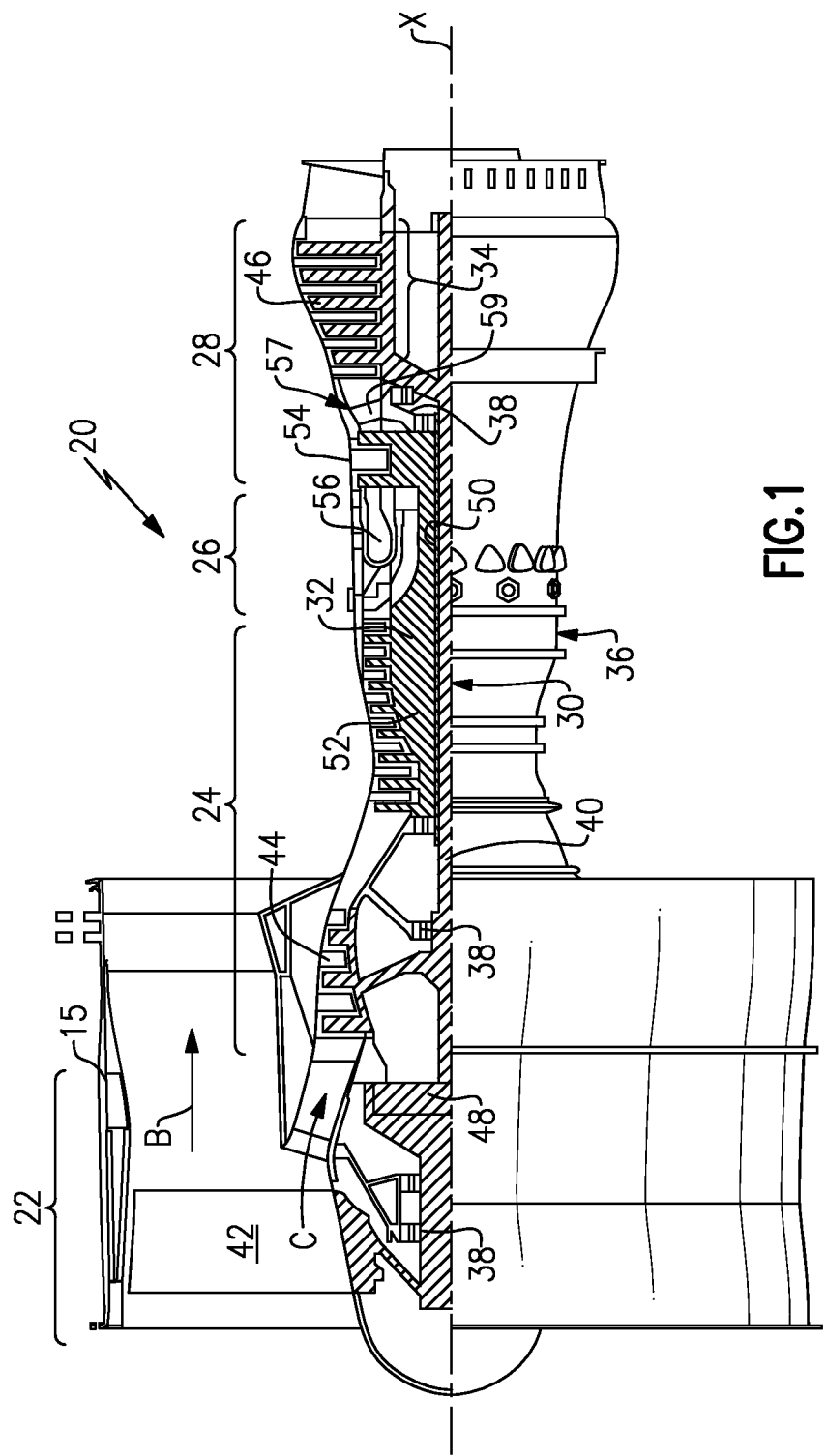
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 (2.3:1) and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 meters/second).

Figure 2:
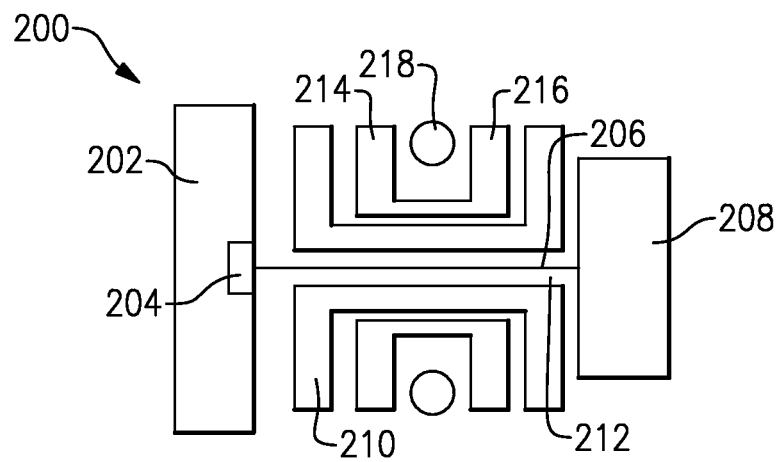
FIG. 2 shows another gas turbine engine embodiment.

FIG. 2 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A first compressor rotor 210 is driven by an intermediate pressure turbine 212, and a second stage compressor rotor 214 is driven by a high pressure turbine rotor 216. A combustion section 218 is positioned intermediate the second compressor rotor 214 and the high pressure turbine section 216.

Figure 3:
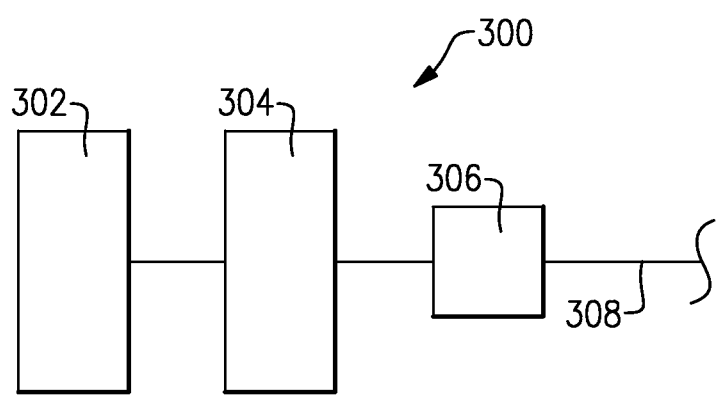
FIG. 3 shows yet another gas turbine engine embodiment.

FIG. 3 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section, i.e., a fan drive turbine section.

The compressor immediately upstream and the turbine immediately downstream of the combustor section comprise a high speed spool. Rotating this spool at even higher speeds and pressures can increase the overall efficiency of the engine. Increased speeds and pressures typically result in higher temperatures, requiring thermal management techniques such as thermal barrier coatings and/or active cooling of the components. An active cooling system 100 is shown in FIG. 4, which coordinates the cooling between the high pressure compressor 52 and the high pressure turbine 54 to lower the temperatures of the high speed spool thus permitting higher speeds and overall pressure ratio (OPR).

Figure 4:
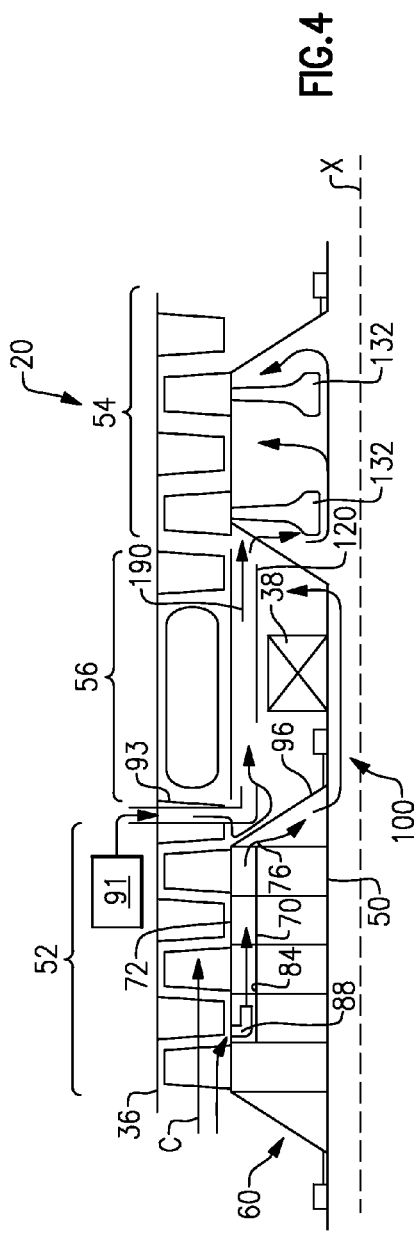
FIG. 4 is a schematic view of an embodiment of a high speed spool of the gas turbine engine.
Figure 6:
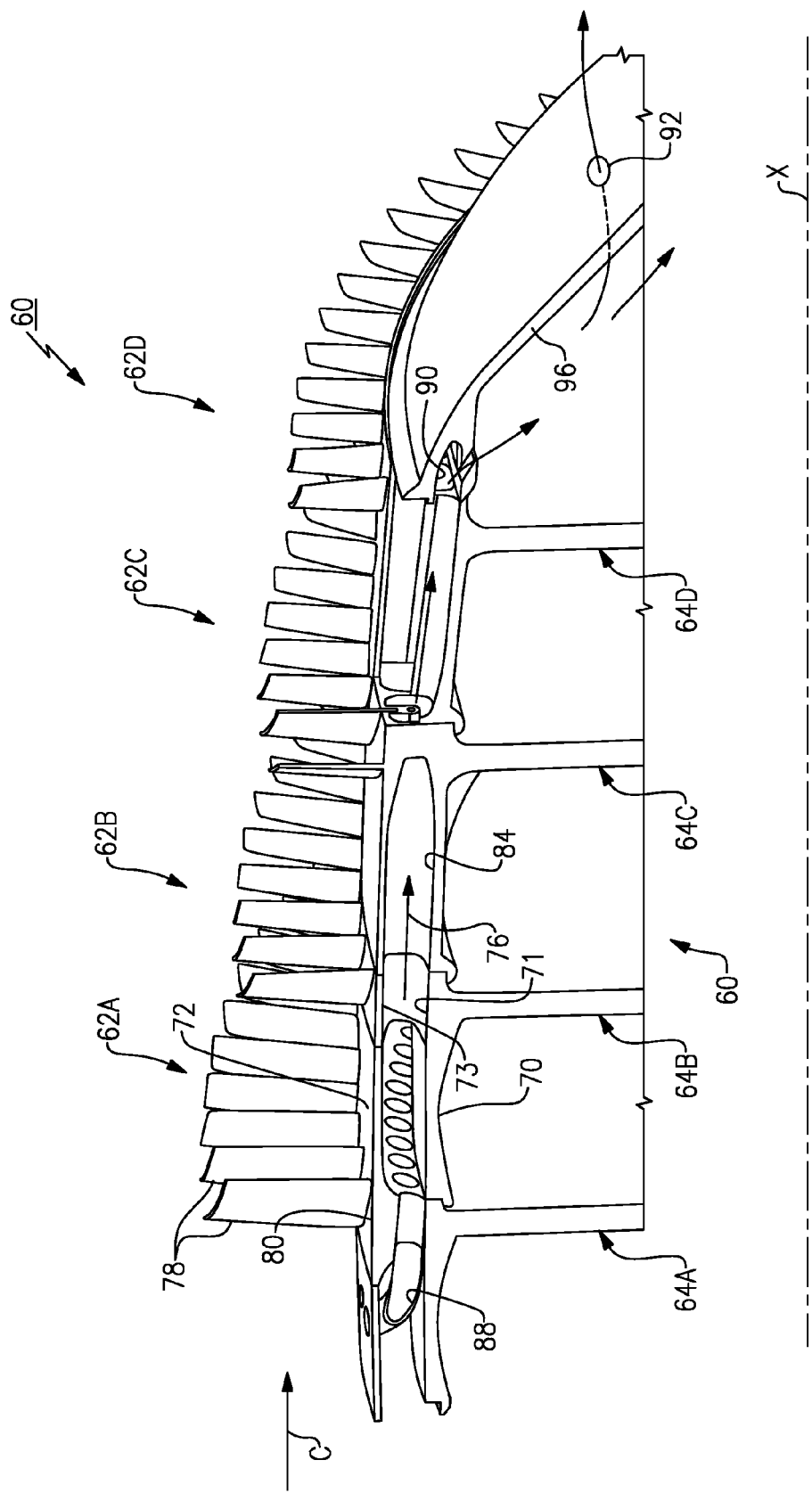
FIG. 6 is a partial perspective view of an embodiment of a rotor assembly.

The high pressure compressor 52 includes a compressor rotor assembly 60 that includes a stack of rotating stages 62A-62D provided by rotor disks 64A-64D, as shown in FIGS. 4 and 6. The compressor rotor assembly 60 has spaced apart inner and outer portions 70, 72 that provide an axially extending cooling channel 84. In the disclosed embodiment, the outer portion 72 has a blade inner surface 73. The inner portion 70 provides a rotor outer peripheral surface 71. The cooling channel 84 is defined between the rotor outer peripheral surface 71 and the blade inner surface 73. Compressor blades 78 extend radially outward from the outer portion 72, which provides an inner core flow path for the core gas flow C. An inlet opening 88 is configured to receive a first cooling flow 76 fluidly connecting the outer portion 72 to the cooling channel 84. The compressor rotor assembly 60 has one or more coolant exits 90, 92 in fluid communication with the cooling channel 84.

FIG. 6 illustrates an isolated schematic perspective view of the compressor rotor assembly 60 of the gas turbine engine 20. In the example, the rotor disks 64A-64D are bonded to one another using TLP or P/TLP to create the integral cooling channels 84. The blades 78 are bonded to the inner portion 70, forming "rotor spokes," such that the blades' platforms provide the outer portion 72. The blades 78 may also be integrally formed with the inner portion 70 as a unitary, one-piece component without separately bonded pieces. Of course other arrangements can be used to provide the cooling channels 84. The coolant exits 90, 92 are provided in a hub 96 at the end of the stack. The first cooling fluid 76 may be routed through the outer shaft 50, or in any other suitable manner, to communicate the first cooling fluid 76 over to the turbine rotor 132.

One example compressor rotor assembly is disclosed in U.S. patent application Ser. No. 13/594,474, entitled "SECONDARY FLOW ARRANGEMENT FOR SLOTTED ROTOR," filed Apr. 30, 2012, which is incorporated herein by reference in its entirety.

Figure 7:
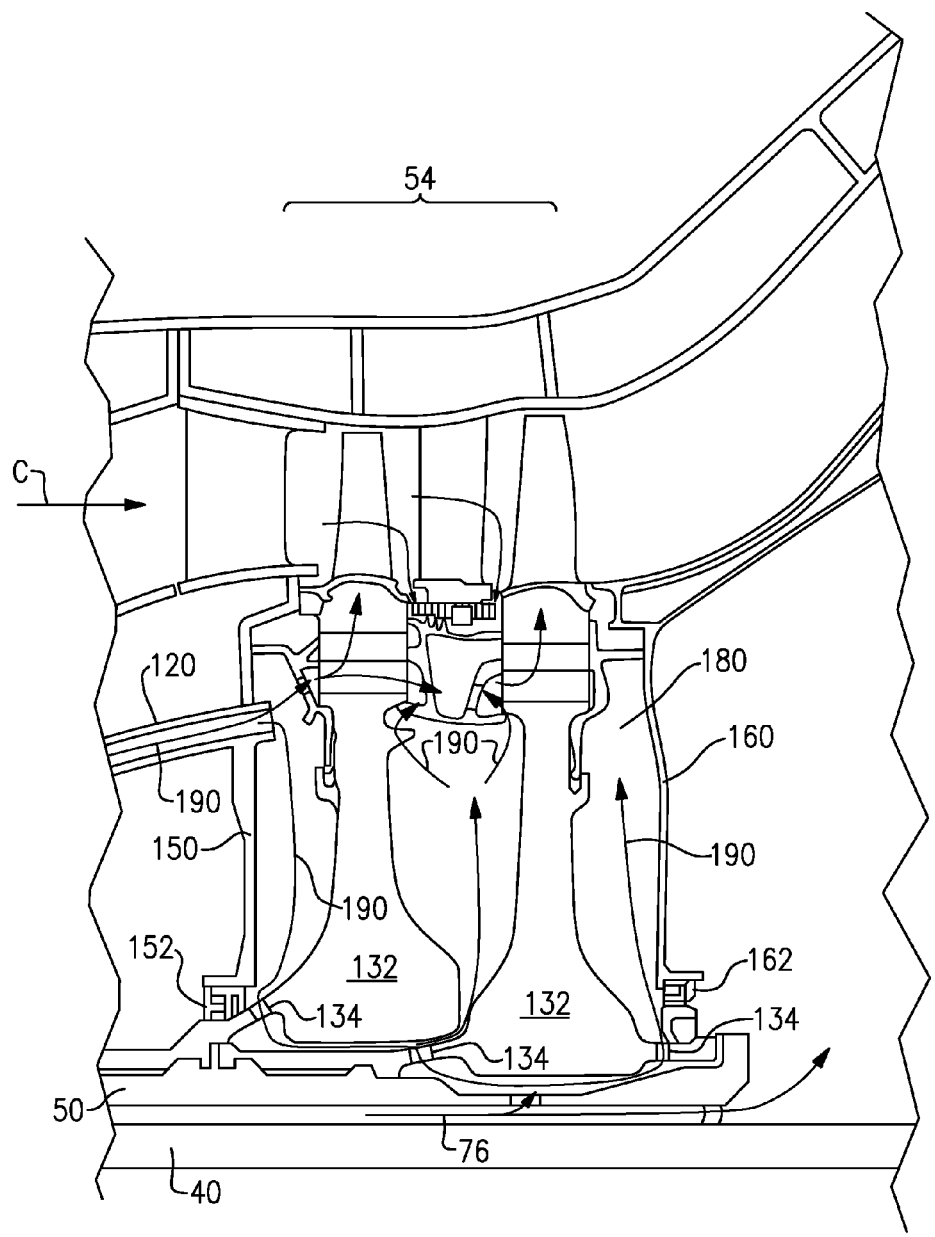
FIG. 7 schematically illustrates a section of an embodiment of a gas turbine engine.

FIG. 7 schematically illustrates an example high pressure turbine section 54 in more detail. In existing gas turbine engines, the portions of the rotors extending radially inward do not extend into a single thermally isolated cooling plenum, but rather extend into a plenum with multiple environments. The thermally isolated cooling plenum 180 is in a space positioned radially inward of the core gas flow path C, radially inward of the high pressure turbine section 54.

The high pressure turbine 54 includes a turbine rotor 132, as shown in FIGS. 4 and 7. The compressor rotor assembly 60 is configured to communicate the first cooling flow 76 to the turbine rotor 132. A bleed source 91 is configured to provide a second cooling flow 190. The combustor section 56 includes a tangential onboard injector 120 in fluid communication with the bleed source 91. The second cooling flow 190 is passed through an exit guide vane 93 to the tangential onboard injector 120, which is configured to communicate the second cooling flow 190 to the turbine rotor 132.

The air within the plenum 180 is thermally isolated from adjacent air by a forward wall 150, an aft wall 160, an inner diameter of the core flow path C, and the outer shaft 50. Each of the forward wall 150 and the aft wall 160 extends radially inward from the inner diameter of the core flow path C, and is sealed against the turbine rotor 132. The forward wall 150 is sealed against a root portion 134 of the forward rotor 130 via a seal 152 (alternately referred to as a fore seal). Similarly, the aft wall 160 is sealed against the turbine rotor 132 via a seal 162 (alternately referred to as an aft seal). The seals 152, 162 provide a barrier that prevents air from entering the thermally isolated cooling plenum 180 from the adjacent cavities that are at a higher pressure.

The thermally isolated cooling plenum 180 receives the second cooling flow 190 from the tangential onboard injector 120, which extends through the forward wall 150. Due to the sealed nature of the thermally isolated cooling plenum 180, the only source of air entering the thermally isolated cooling plenum 180 is the first and second cooling flows 76, 190. The first cooling flow 76 enters the plenum 180 through the outer shaft 50 and/or the tangential onboard injector 120. In order to minimize thermal gradients the first and second cooling fluids 76, 190 cool the entire turbine rotor 132.

One example thermally isolated turbine rotor is disclosed in U.S. Patent Provisional Application Ser. No. 62/008,760, entitled "THERMALLY ISOLATED TURBINE SECTION FOR A GAS TURBINE ENGINE," filed Jun. 6, 2014, which is incorporated herein by reference in its entirety.

The active cooling system 100 coordinates cooling flows in the high pressure compressor 52 and the high pressure turbine 54 to lower temperatures, which enables spool speeds and pressures to be increased and engine efficiency improved.

Figure 5:
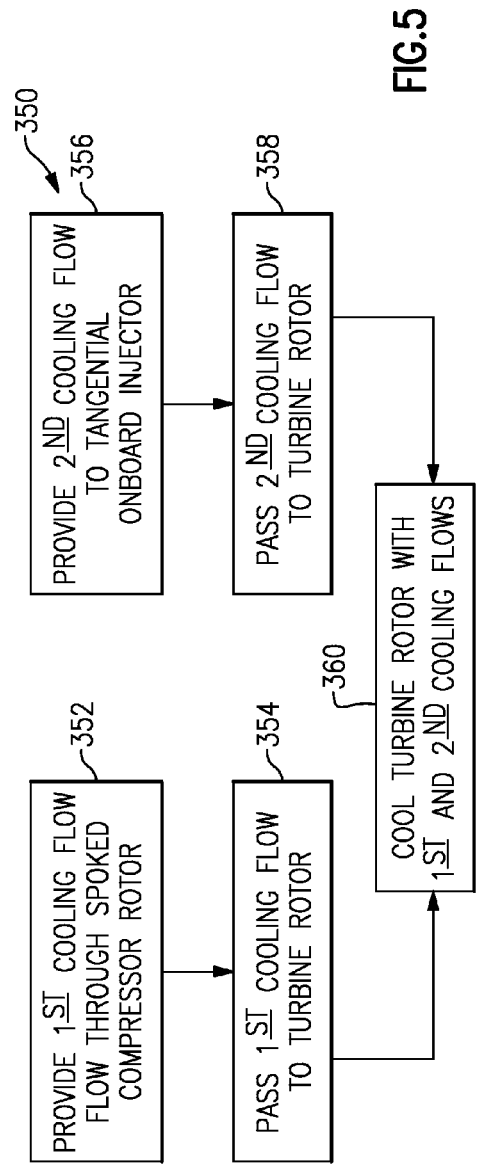
FIG. 5 is a flow chart illustrating an embodiment of a cooling system for the high speed spool.

In operation, a method 350 of cooling the high spool includes providing a first cooling flow 76 through an inlet opening 88 in an inner core flow path of a compressor rotor assembly 60, as indicated at block 352 of FIG. 5. A second cooling flow 190 is provided to the tangential onboard injector 120, as indicated at block 356. The first and second cooling flows 76, 190 are passed to the turbine rotor 132 to cool the turbine rotor 132, as indicated at blocks 354, 358, 360.

It should be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An engine comprising:
    a turbine section includes a turbine rotor arranged in a plenum;
    a compressor section includes a compressor rotor assembly having spaced apart inner and outer portions that provide a cooling channel that extends axially, compressor blades extending radially outward from the outer portion which provides an inner core flow path, and a rotor spoke configured to receive a first cooling flow and fluidly connecting the outer portion to the cooling channel, the compressor rotor assembly has a coolant exit in fluid communication with the cooling channel, the compressor rotor assembly configured to communicate the first cooling flow to the turbine rotor;
    a bleed source configured to provide a second cooling flow;
    a combustor section includes a tangential onboard injector in fluid communication with the bleed source, the tangential onboard injector configured to communicate the second cooling flow to the turbine rotor; and
    wherein the compressor rotor assembly has a rotor disk that includes a rotor outer peripheral surface, and wherein the compressor blades are supported on a platform that has a blade inner surface that faces the rotor outer peripheral surface, and wherein the cooling channel is defined between the rotor outer peripheral surface and the blade inner surface.

2. The engine according to claim 1, wherein the compressor blades are bonded to the inner portion.

3. The engine according to claim 1, wherein an inlet opening is arranged upstream from and adjacent to the compressor blades, the inlet opening configured to supply the first cooling flow to the cooling channel.

4. The engine according to claim 1, wherein the compressor section provides the bleed source.

5. The engine according to claim 1, wherein the compressor rotor assembly includes a hub arranged adjacent to the combustor section, and wherein the coolant exit is provided in the hub.

6. The engine according to claim 1, wherein the combustor section includes an exit guide vane arranged axially between the compressor rotor assembly and a combustor, the exit guide vane configured to communicate the bleed air radially inward from the bleed source toward the tangential onboard injector.

7. The engine according to claim 1, wherein the compressor blades are integrally formed as one piece with the rotor disk.

8. The engine according to claim 1, wherein the turbine rotor is arranged in a plenum configured to receive the first and second cooling flows.

9. The engine according to claim 8, wherein the plenum is arranged radially inward of a core flow path, wherein the plenum is defined by a forward wall, a shaft, an aft wall, and an inner diameter wall of the core flow path, and wherein the first and second cooling flows are isolated from the core flow path.

10. The engine according to claim 9, wherein the tangential onboard injector extends into the plenum to deliver at least the second cooling flow to the turbine rotor.

11. The engine according to claim 9, wherein the shaft, to which the compressor rotor assembly is mounted, communicates the first flow to the plenum.

12. A method of cooling a gas turbine engine turbine section, the method comprising steps of:
    providing a first cooling flow through an opening in an inner core flow path of a compressor rotor assembly of a compressor section, the compressor rotor assembly having spaced apart inner and outer portions that provide a cooling channel that extends axially, wherein the compressor rotor assembly has a rotor disk that includes a rotor outer peripheral surface, and wherein a blade is supported on a platform that has a blade inner surface that faces the rotor outer peripheral surface, the cooling channel is defined between the rotor outer peripheral surface and the blade inner surface;
    providing a second cooling flow to an injector; and
    passing the first and second cooling flows to a turbine rotor to cool the turbine rotor.

13. The method according to claim 12, wherein the cooling channels are beneath the inner core flow path, and wherein a spoke extends from the inner core flow path into a cooling channel adjacent to the blade.

14. The method according to claim 13, wherein the compressor rotor assembly includes a coolant exit, wherein passing the first and second cooling flows further includes communicating the first cooling flow from the coolant exit to the turbine rotor.

15. The method according to claim 12, wherein providing the second cooling flow further includes includes supplying bleed air from a bleed source.

16. The method according to claim 15, wherein the turbine rotor is arranged in a plenum, and passing the first and second cooling flows further includes communicating the first and second cooling flows to the plenum.

17. The method according to claim 16, comprising a step of preventing air from an adjacent plenum fore of said plenum from entering said plenum by at least disposing a first seal at a joint between a fore wall of the plenum and a structure of a first rotor in said plenum.

18. The method according to claim 16, comprising a step of preventing air from an adjacent plenum aft of said plenum from entering said plenum by at least disposing a second seal at a joint between an aft wall of the plenum and a structure of a second rotor in said plenum.

* * * * *